(12) United States Patent
Hall et al.

(10) Patent No.: US 8,556,682 B2
(45) Date of Patent: Oct. 15, 2013

(54) COMMERCIAL PACKAGING OF DISPOSABLE CLEAVER

(75) Inventors: Radawan Hall, Granite Falls, NC (US); Dennis M. Knecht, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 432 days.

(21) Appl. No.: 12/843,114

(22) Filed: Jul. 26, 2010

(65) Prior Publication Data

US 2012/0018481 A1     Jan. 26, 2012

(51) Int. Cl.
*B65H 35/10*     (2006.01)

(52) U.S. Cl.
USPC ............. 451/69; 451/41; 451/54; 225/96.5; 65/433

(58) Field of Classification Search
USPC ........... 451/41, 54, 69, 557; 225/96.5; 65/433
See application file for complete search history.

(56) References Cited

U.S. PATENT DOCUMENTS

| | | | |
|---|---|---|---|
| 2,133,009 A * | 10/1938 | Ballash | 451/548 |
| 3,975,865 A * | 8/1976 | Lewis | 451/359 |
| 4,630,764 A * | 12/1986 | West | 225/2 |
| 4,643,520 A | 2/1987 | Margolin | 350/96.2 |
| 4,674,833 A | 6/1987 | Des Forges et al. | 350/96.21 |
| 4,843,766 A * | 7/1989 | Umeda | 451/69 |
| 4,967,518 A * | 11/1990 | Moulin | 451/57 |
| 5,184,433 A * | 2/1993 | Maack | 451/41 |
| 5,351,333 A | 9/1994 | Chambers | 385/134 |
| 5,408,558 A | 4/1995 | Fan | 385/80 |
| 5,563,974 A | 10/1996 | Carpenter et al. | 385/85 |
| 6,901,199 B2 * | 5/2005 | Tabeling | 385/134 |
| 7,377,700 B2 * | 5/2008 | Manning et al. | 385/72 |
| 8,069,691 B2 * | 12/2011 | Murgatroyd | 65/433 |
| 2006/0105684 A1 * | 5/2006 | Lurie et al. | 451/41 |

FOREIGN PATENT DOCUMENTS

WO     WO2009-015918 A1     4/2009

* cited by examiner

*Primary Examiner* — Joseph J Hail
*Assistant Examiner* — Henry Hong

(57) ABSTRACT

A method of cleaving an optical fiber using a disposable abrasive film is disclosed. The method includes preparing an end of an optical fiber by exposing a length of the optical fiber. The exposed optical fiber is brought into contact with a tangential swipe formed of abrasive film to cause the optical fiber to cleave substantially at the location of contact leaving an optical fiber stub with a cleaved end. The optical fiber stub is polished with a polishing film having a coarse grit and may be polished a second time with a polishing film having a fine grit.

22 Claims, 4 Drawing Sheets

COMMERCIAL PACKAGING OF DISPOSABLE CLEAVER

BACKGROUND

The present disclosure generally relates to optical fiber equipment and related tools, and in particular to optical fiber cleavers and cleaving tools having a disposable cleaver.

Optical fibers can be used to transmit or process light in a variety of applications. Benefits of optical fiber include extremely wide bandwidth and low noise operation. Because of the advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections.

Optical communication networks involve termination preparations to establish connections between disparate optical fibers. For example, optical fibers can be spliced together to establish an optical connection and in some cases, it may be necessary for a technician to establish the optical connection in the field. This involves cutting or cleaving of the optical fiber to prepare an appropriate end face on the optical fiber. The technician may employ a cleaver that includes a blade to score, scribe, or otherwise induce a flaw in the glass of the optical fiber. Inducing a flaw in the glass of an optical fiber precedes breaking the glass at the flaw to produce an end face. The blade may either be pressed into the glass or swiped across the glass to induce the flaw. The end face can then either be spliced to another optical fiber or connectorized with a fiber optic connector to establish an optical connection.

Typically, in order to cleave an optical fiber properly, the optical fiber must be precisely positioned relative to a set of critical components within a fiber cleaver, such as a fiber alignment element, a fiber gripping surface, a conventional cleaver blade, and a cleaving anvil.

However, conventional cleaver blades are expensive. Conventional cleaver blades may employ an expensive hardened material(s), including diamond, sapphire, ruby, ceramics, steel, and carbide, as examples. Further, the conventional cleaver blade needs to include an extremely sharp edge to minimize the size of the flaw induced in the glass to reduce risk of damaging the core of the optical fiber to provide efficient light transfer. Providing a sharp edge on the conventional cleaver blade adds cost. Inducing a large flaw in the glass may create a poor end face. Maintenance must be provided to keep the conventional cleaver blade sharp. Further, traditional cleavers may not always be available in the field. A need thus exists for a less expensive disposable cleaver and method of cleaving an optical fiber that can be used in the field in the absence of a traditional cleaver. It is to the provision of such a cleaver and method that the present disclosure is primarily directed.

SUMMARY

Briefly described, in one embodiment, a method is disclosed for preparing an end of an optical fiber to be connectorized or otherwise coupled to the end of another optical fiber. The optical fiber traditionally has a core, a cladding, and a coating. The method comprises the steps of exposing a length of the optical fiber, contacting the exposed optical fiber with a tangential swipe abrasive film to cause the optical fiber to cleave substantially at the location of contact leaving an optical fiber stub with a cleaved end, and polishing the cleaved end of the optical fiber stub. In another embodiment, a method is disclosed of cleaving an optical fiber with the method comprising the steps of engaging the optical fiber with a tangential swipe of an abrasive film, moving the edge of the abrasive film and the surface of the optical fiber with respect to each other so that the abrasive film at least scores the surface of the optical fiber, and stressing the optical fiber to cause the optical fiber to cleave substantially at the location of engagement.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing summary and the following detailed description are merely exemplary of preferred embodiments, and are intended to provide an overview or framework to understanding the nature and character of the claims. The accompanying drawings are included to provide a further understanding, and are incorporated in and constitute a part of this specification. The drawings illustrate the exemplary embodiments, and together with the description serve to explain principles and operation of the various embodiments.

BRIEF DESCRIPTION OF THE DRAWINGS

The components of the drawing figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

The present disclosure is directed to a flexible cleaver for use in conjunction with a hand held fiber cleaving tool. Another aspect of the present disclosure is the use of a hand held fiber cleaver to cleave a plurality of different fiber optic cable constructions using a flexible cleaving blade that is disposable and inexpensive. Although disclosed primarily within the context of a hand held fiber cleaving tool, the skilled artisan will recognize that the principles of the present disclosure are not so limited but extend to any type of cleaving tool wherein optical fibers do not require alignment before being treated in some way.

Figure 1:
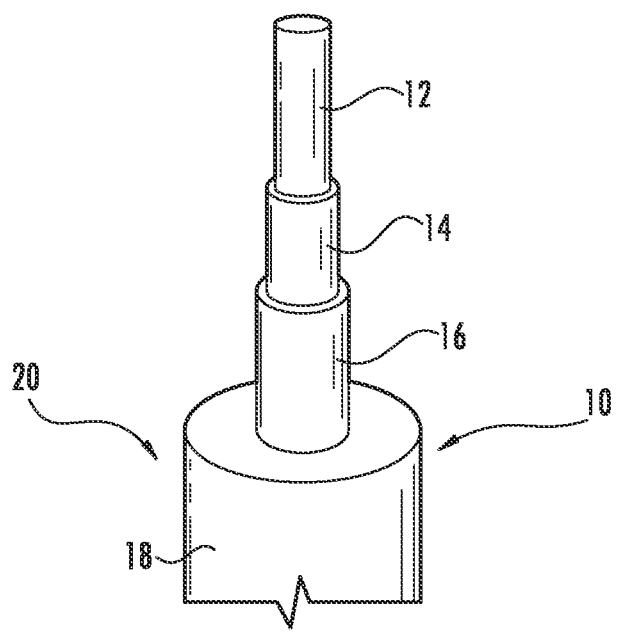
FIG. 1 is an a isometric view of a portion of partially stripped fiber optic cable showing the buffer, coating, cladding and core according to a first embodiment.

FIG. 1 is an isometric view showing a typical optical fiber 10 according to a first embodiment of the disclosure. The optical fiber 10 is comprised of a core 12, a cladding 14, and a coating 16. The core 12 and cladding 14 may be a monolithic structure with both layers fabricated as a single element. However, for discussion purposes, the two layers (core 12 and cladding 14) are illustrated as two separate and distinct elements or layers. A buffer 18 may surround the optical fiber 10 and the entire structure or assembly is considered to be a fiber optic cable 20. The buffer 18 may be an elastomeric material and functions to protect the optical fiber 10 from external elements such as, for example, the weather, humidity and heat, shipping and handling, and installation. A typical optical fiber 10 cleavable according to the present description may have a diameter on the order of 200 microns (μm), which is considered to be "large diameter" core fiber. Typical large diameter core fibers range from 100 μm to 300 μm. The optical fiber 10 and may be either glass or plastic.

Figure 2:
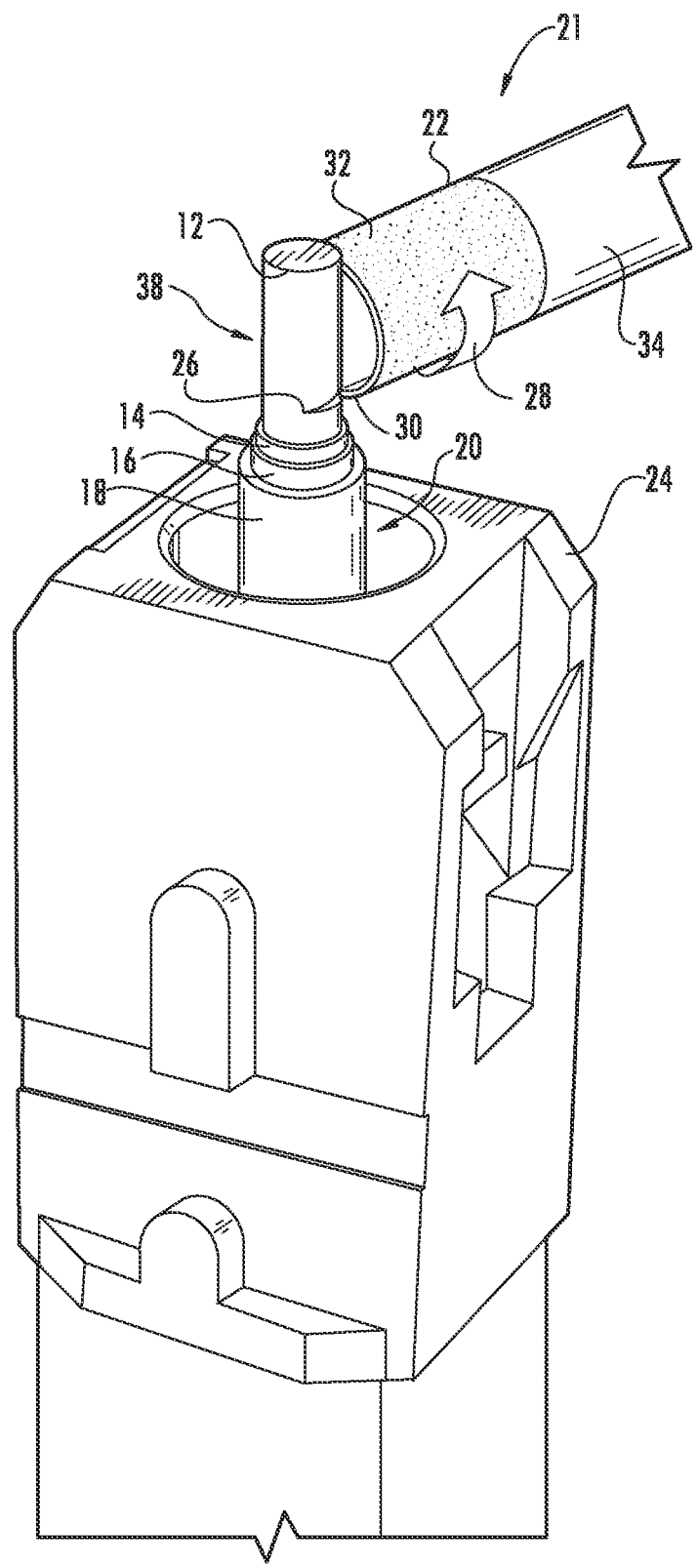
FIG. 2 is an isometric view of a fiber optic cable disposed within a fiber optic connector and a cleaving tool according to this disclosure engaging the optical fiber and scoring the optical fiber.

FIG. 2 is an isometric view of the end of fiber optic cable 20 disposed within a fiber optic connector 24 with a cleaving tool 21 according to an embodiment of this disclosure engaging the optical fiber 10. The cleaving tool 21 may be comprised of an abrasive film 22 attached to an end portion of a handle 34. The abrasive film 22 may be material provided in grit form on the handle 34 or may be a small piece of thin film 22 attached wrapped partially around the end of and attached to the handle 34. When attached to the handle 34, the abrasive film 22 has a film body 32, which takes on a tangential swipe form, which can be arcuate, curved, cylindrical, or a straight shape, and combinations thereof, as a result of being wrapped around the handle 34, and a film end or edge 30, which, for example, is arcuate in shape. The abrasive film 22 may be provided by any type of material or combination or compound of elements or materials. Examples of the material of abrasive film 22 include, but are not limited to, diamond, silicon carbide, aluminum oxide, silicon dioxide, cerium oxide, and ferric oxide. The thickness of the abrasive film 22 may be any suitable thickness, but preferably is relatively thin for the purpose of this disclosure. As an example only, the thickness of the abrasive film 22 may be between 5 μm and 25 μm, and more specifically may be a 15 μm thick silicon carbide film. Such films are known in the art and are used, for instance, to polish optical fibers and for other purposes.

An abrasive film 22 for cleaving an optical fiber may be more economical than a conventional cleaver blade. This is because the abrasive film 22 for cleaving an optical fiber may cost on the order of cents, whereas conventional cleaver blades can cost tens of dollars up to a hundred dollars, for example. By employing a less expensive abrasive film 22, costs associated with maintaining a sharp edge on a cleaver blade to avoid inducing a large flaw in an optical fiber are avoided. Consequently, with the cleavers and methods disclosed herein, it is financially feasible to dispose and replace a used abrasive film 22 attached with the handle 34 with a new abrasive film 22 after a few uses. For example, the abrasive film 22 may be disposed and replaced after 10 to 20 cleaves. The abrasive film 22 may be disposed on a rigid or flexible handle 34. If the abrasive film 22 is disposed on a flexible handle 34, the abrasive film 22 may be easily disposed and replaceable in a variety of forms, thus making these forms feasible for use by technicians to cleave optical fibers. In one embodiment, a small piece of abrasive film is simply wrapped around the end portion of a pencil-shaped round handle and attached thereto. This forms the edge of the film into an arc and exposes it in such a way that it can be brought into contact with an optical fiber and the handle rotated or otherwise manipulated to move the edge across the surface of the fiber to facilitate a cleave.

When splicing or connectorizing the optical fiber 10, it may be necessary to provide a polished end face 36 (see FIG. 3) on the optical fiber 10 to reduce insertion losses at fiber-to-fiber interfaces when the end face 36 is aligned with an end face of another optical fiber to transfer optical signals from one fiber to another. When splicing or connectorizing an optical fiber, it is important to provide an end face 36 that has a relatively smooth and mirror-like surface to achieve an efficient light transfer. It is also important to avoid damaging the core 12 and/or the cladding 14 of the optical fiber 10. In this regard, and according to one embodiment, the end face 36 is prepared by scoring a flaw 26 into the surface of the optical fiber 10, similar to scoring a sheet of glass with a glass cutter before breaking the glass. The end face 36 is formed when the scored optical fiber 10 is stressed, such as by bending it slightly, which causes it to break at the location of the scored flaw 26. According to the present disclosure, the flaw 26 is created by scoring the optical fiber 10 with the abrasive film 22, as described in detail below.

Instead of employing a conventional blade and cleaving tool to cleave the optical fiber, the abrasive film 22 is employed. As discussed herein, the abrasive film 22 is disposed on a handle 34 and attached thereto in such a way that the exposed edge of the film takes on an tangential swipe form which is, for example, an arcuate shape. The handle 34 is controlled to bring the edge 30 of the abrasive film 22 in contact with the optical fiber 10. The handle may then be manipulated such as, for instance, by being rotated, to score a flaw 26 in the surface of the optical fiber 10. Slight stress induced in the optical fiber such as by bending it then causes the fiber to break at the location of the flaw and the end face 36 is at the end of the remaining optical fiber stub 38. In this manner, the abrasive film 22 is used to cleave the optical fiber 10. In the illustrated embodiments, the edge of the abrasive film is used to score the flaw; however, this is not necessarily required and other parts of the film may be used within the scope of the disclosure.

The abrasive film 22 is not a conventional cleaving blade, and thus is orders of magnitude less expensive. A conventional cleaving blade typically is made of a hardened material that has a highly honed and precisely shaped sharp edge. These blades are used in optical cleavers, that themselves are expensive and, as mentioned above, not always readily available to an installer in the field. The abrasive film 22 does not have the same sharp edge as a cleaving blade and does not posses the blades precise smooth surfaces. Further, the tool disclosed herein lacks the precise alignment and action of a traditional fiber cleaver. As a result, the end face 36 created according to the method of this disclosure may not be ideal for reducing insertion losses at the junction of two optical fibers. To address this, the end face 36 preferably, but necessarily, should be polished after having been cleaved, as described in more detail below.

The abrasive film 22 is attached to the handle 34 by any suitable means, such as, for example, using an adhesive bond, a tape, or a mechanical connector. In some embodiments, a handle 34 may not be required at all if the abrasive film 22 can be formed into an tangential swipe form, for example, an arcuate shape and its edge 30 used to score and cleave the optical fiber 10. If a handle is used, the means of attaching the abrasive film 22 to the handle should allow for the abrasive film 22 to be quickly and easily installed and removed from the handle 34. Although illustrated as a cylindrical handle 34, the handle 34 may be any shape or size that facilitates moving the abrasive film 22 into contact with the optical fiber 10 and manipulating it to score a flaw 26 into the optical fiber 10. The handle 10 should support the abrasive film 22 such that the edge of the abrasive film 22 is a tangential swipe, for example, curved or arcuate, to aid in the manipulation of the edge on the surface of the optical fiber. For example, the handle 34 may be cylindrical with the abrasive film 22 attached to an end of the handle 34 in such a way that the abrasive film 22 is also at least partially cylindrical. As such, the film edge 30 would also be a tangential swipe, for example, a curved or arcuate shape. If the handle 34 is approximately cylindrical such that the abrasive film 22 is also approximately cylindrical, the diameter of the arc of the film edge should be between 4 millimeters (mm) and 12 mm for the best results.

The handle 34 may be controlled by hand to move the edge of the abrasive film 22 into contact with the optical fiber 10 and move its edge across the surface of the fiber to score the flaw 26 in the optical fiber 10. In the embodiment of FIG. 2, the optical fiber 10 is held in place by the connector, which facilitates the cleaving operation better. The handle 34 may be moved in a circular or swirling motion 28, for example, or it may be rotated about its axis to cause the edge of the film to move across the surface of the fiber. The handle 34 may be moved in a side-to-side or a swiping motion as well to induce the flaw. The type of motion used to control the handle 34 in order to introduce the flaw 26 in optical fiber 10 will at least depend on the shape and arc of the abrasive film 22. Alternatively, the handle 34 could be held in place and the optical fiber 10 moved into contact with the abrasive film 24 with the optical fiber being then moved with respect to the film to induce the flaw. In either case, relative movement is created between the optical fiber 10 and the abrasive film 24 to create the flaw 26.

The handle 34 may be any material that is configured to support the abrasive film 22 disposed or deposited thereon. The abrasive film 22 may be disposed on a surface of the handle 34. The abrasive film 22 may be disposed or deposited on substantially the entire surface area of the handle 34 or only a portion of the surface area of the handle 34. The handle 34 may be of any size and made from any type of material desired, including but not limited to a polymer, plastic, wood, and metal, as examples. Additionally, the handle 34 may be rigid or flexible. The quality and nature of the abrasive film 22 and the handle 34 determine the life or number of uses available to cleave optical fibers 10. When the film 22 is spent, it can merely be removed and discarded and replaced with another strip of film. Alternatively, the entire tool may be discarded, particularly if the handle is simple and inexpensive such as, for instance, a round wooden dowel.

In use, an end of the fiber optic cable 20 is prepared to expose a length of optical fiber 10 as is known in the art. Any coating disposed on the outside of the optical fiber 10 is removed prior to placing the abrasive film 22 in contact with the optical fiber 10 so that the abrasive film 22 directly contacts glass of the optical fiber 10. In this regard, any coating disposed around the core 12 and/or the cladding 14 (i.e. the coating 16 and buffer 18) may be removed prior to placing the abrasive film 22 in contact with the optical fiber 10.

The optical fiber 10 may be placed under tension prior to placing the abrasive film 22 in contact with the optical fiber 10 to cleave the fiber, although this is not required. Placing the optical fiber 10 under tension reduces movement of the optical fiber 10 when contacted by the abrasive film 22. However, where the optical fiber 10 is a large diameter optical fiber as described above and is therefore more rigid, it may not and typically does not require being placed under stress. Placing the optical fiber 10 under stress prior to inducing the flaw 26 in the optical fiber 10 with the abrasive film 22 may also propagate the induced flaw 26 through the glass of the fiber to cleave the optical fiber 10.

In practice, the optical fiber may be cleaved while supported in a connector 24. It is not required that the optical fiber be supported by connector 24, but supporting the optical fiber 10 by some means may facilitate the cleaving operation and result in a cleaner break.

After the optical fiber 10 is scored by the abrasive film 22 and broken at the resulting flaw 26, the end face 36 is created. The end face 36 is disposed in a top portion of the optical fiber stub 36 and is generally in a cross-sectional plane substantially orthogonal to a longitudinal axis of the optical fiber 10. However, the abrasive film 22 may also be used to provide an angle-cleaved end face in the portion 24 of the optical fiber 10, if desired. For example, the optical fiber 10 may be rotated during the introduction of the flaw 26 with the abrasive film 22 to affect the angle of the end face created in the optical fiber 10. The apex of the bend disposed in the portion 24 of the optical fiber 10 when the abrasive film 22 is used to induce the flaw 26 can also affect the angle of the end face created in the portion 24 of the optical fiber 10.

Figure 3:
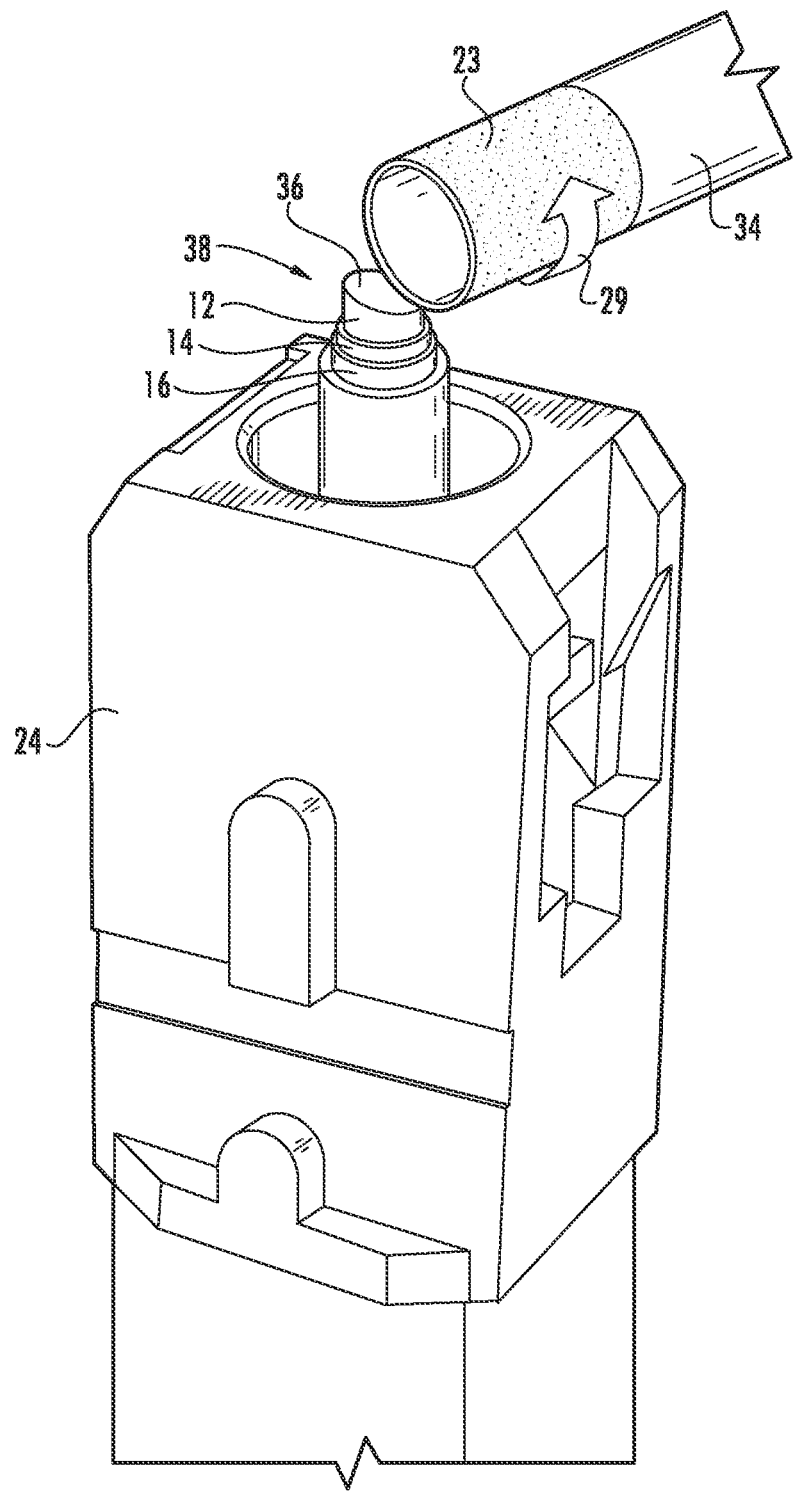
FIG. 3 is an isometric view of the connector and cleaved optical fiber being polished.

FIG. 3 is an isometric view of the connector and cleaved optical fiber being polished. After the optical fiber 10 is cleaved, the optical fiber stub 38 may be abraded with a polishing film 23 having a first relatively course grit and subsequently abraded with a subsequent polishing film having a second relatively fine grit. The polishing film 23 may be attached to the handle 34 in a similar fashion as the abrasive film 22. To polish the end face 36, the handle 34 may be controlled in a circular or swirling motion 29, for example; or, the handle 34 may be controlled in a swiping motion as well. The polishing film 23 may have a first relatively course grit ranging between 10 µm and 20 µm and the second polishing film may have a second relatively fine grit ranging between 1 µm and 5 µm. The use of a second polishing film may decrease insertion loss at the junction of the end face because of an improved interface between the optical fiber stub 38 and a connectorized adjacent optical fiber stub (not shown). The polished end face 36 does not scatter the light of the optical signal as does an unpolished end face. Polishing the end face 36 of the optical fiber stub 38 with a second polishing film may reduce signal loss at the interface by as much as 40%.

Figure 4:
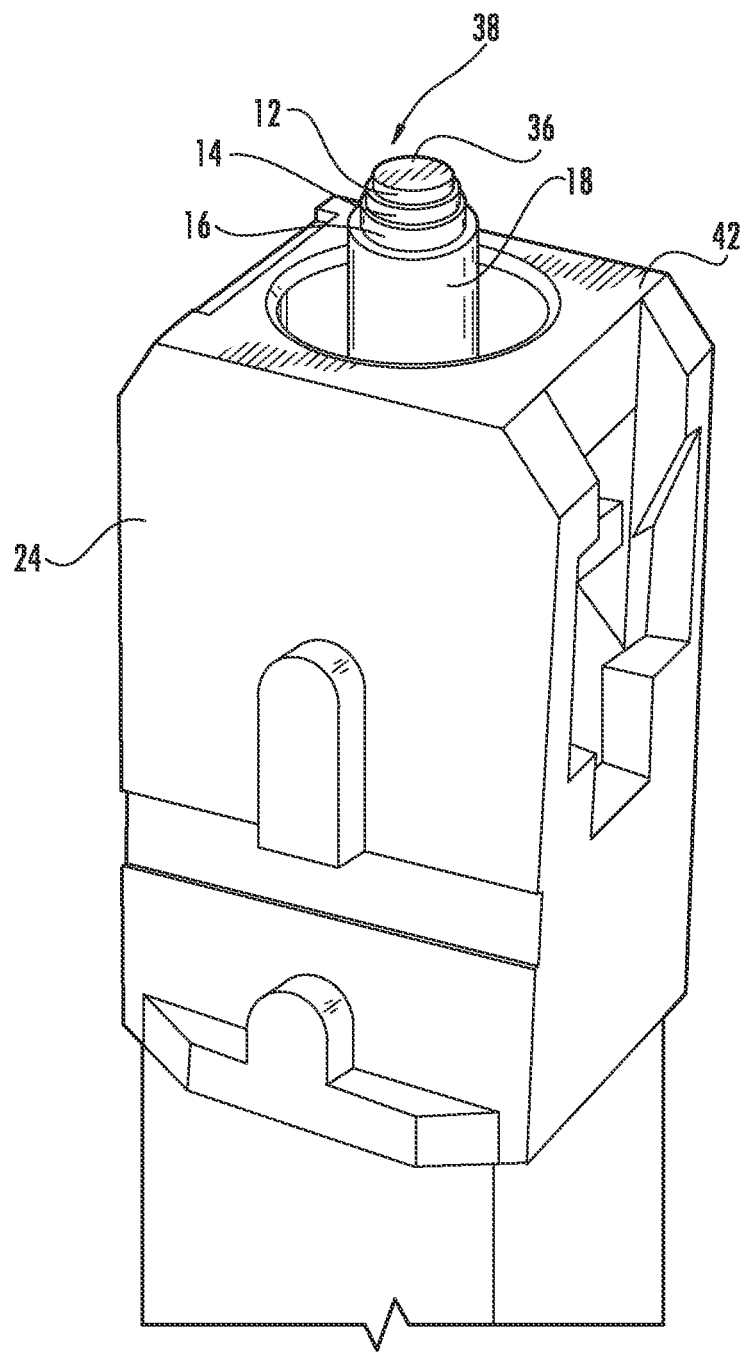
FIG. 4 is an isometric view of the cleaved and polished optical fiber positioned within the connector.

FIG. 4 is an isometric view of the cleaved and polished optical fiber 10 positioned within the connector 24. It is desirable for the polished end face 36 to be polished to an established distance beyond an end 42 of the connector 24 that may be between about 1 mm and 3 mm. A long fiber stub could be used, but with limit durability, and thus a shorter fiber stub is therefore preferred. However, a long fiber stub may be suitable for some uses, such as a Unicam connector.

It will be apparent to those skilled in the art that various modifications and variations can be made without departing from the spirit and scope of the invention exemplified herein, which is limited only by the claims.

What is claimed is:

1. A method of cleaving an optical fiber comprising the steps of:
   engaging an outer circumferential surface of the optical fiber with an abrasive film comprising a hollow cylindrical film body ending at an arcuate tangential swipe edge;
   moving the arcuate tangential swipe edge of the abrasive film and the outer circumferential surface of the optical fiber with respect to each other so that the arcuate tangential swipe edge scores the outer circumferential surface of the optical fiber;
   stressing the optical fiber to cause the optical fiber to cleave substantially at the location of engagement with the arcuate tangential swipe edge of the abrasive film leaving an optical fiber stub; and
   polishing the optical fiber stub.

2. The method of claim 1 and wherein the abrasive film is wrapped about the surface of an arcuate handle.

3. The method of claim 2 and wherein the surface of the handle is generally complementary to the tangential swipe.

4. The method of claim 1 and wherein before engaging the optical fiber with the tangential swipe edge of the abrasive film, exposing a length of the optical fiber and inserting the end of the optical fiber into a connector until the optical fiber is exposed.

5. A method of cleaving an optical fiber comprising the steps of:
- wrapping an abrasive film to form a hollow cylindrical film body ending at an arcuate tangential swipe edge;
- engaging an outer circumferential surface of the optical fiber with the arcuate tangential swipe edge of the abrasive film;
- moving the arcuate tangential swipe edge of the abrasive film and the outer circumferential surface of the optical fiber with respect to each other so that the arcuate tangential swipe edge at least scores the outer circumferential surface of the optical fiber;
- stressing the optical fiber to cause the optical fiber to cleave substantially at the location of engagement with the arcuate tangential swipe edge of the abrasive film leaving an optical fiber stub; and
- polishing the optical fiber stub.

6. The method of claim 1 and wherein the abrasive film is a diamond film.

7. The method of claim 1 and wherein the abrasive film is a silicon carbide film.

8. The method of claim 7 and wherein the silicon carbide film is a 15 micron film.

9. The method of claim 1 and further comprising abrading the optical fiber stub with at least one polishing film.

10. The method of claim 9 and further comprising abrading the optical fiber stub with a first polishing film having a first relatively course grit and subsequently abrading the optical fiber stub with a second polishing film having a second relatively fine grit.

11. The method of claim 10 and wherein the first polishing film is a 15 micron film.

12. The method of claim 11 and wherein the second film is a 1 micron film.

13. The method of claim 1 further comprising polishing the optical fiber stub to reduce its length and to reduce insertion loss at the connector.

14. The method of claim 2 and wherein the tangential swipe edge of the abrasive film and the outer circumferential surface of the optical fiber are moved with respect to each other by rotating the handle.

15. The method of claim 2 and wherein the tangential swipe edge of the abrasive film and the outer circumferential surface of the optical fiber are moved with respect to each other by moving the handle in a generally side to side movement.

16. The method of claim 2, wherein the handle about which the abrasive film is wrapped is provided as part of a hand held cleaving tool for cleaving an optical fiber having a large diameter core, the cleaving tool comprising:
- a flexible cleaving blade comprising the abrasive film; and
- a tool handle wherein the flexible cleaving blade is attached to the tool handle.

17. The method of claim 16, wherein the tool handle has a shape that is complementary to a tangential swipe form.

18. The method of claim 1, wherein the abrasive film that scores the outer circumferential surface of the optical fiber is attached to an end portion of a handle and the method further comprises polishing the cleaved end of the optical fiber stub with a polishing film that is attached to the end portion of the handle.

19. The method of claim 18, wherein:
- the abrasive film that scores the outer circumferential surface of the optical fiber comprises material provided in grit form on the handle or a piece of thin film attached to the handle; and
- the polishing film is provided in grit form on the handle or a piece of thin film attached to the handle.

20. The method of claim 18, wherein the cleaved end of the optical fiber stub is first polished with a polishing film having a first relatively course grit and subsequently with a subsequent polishing film having a second relatively fine grit.

21. The method of claim 20, wherein the polishing films comprising the first relatively course grit and second relatively fine grit are attached to the end portion of the handle in grit form on the handle or as a piece of thin film attached to the handle.

22. The method of claim 1 and wherein the abrasive film is a flexible abrasive film.

* * * * *